United States Patent
Gao et al.

(10) Patent No.: US 11,860,271 B2
(45) Date of Patent: Jan. 2, 2024

(54) SPHERICAL DUAL-POLARIZATION PHASED ARRAY WEATHER RADAR

(71) Applicant: Meteorological Observation Centre of China Meteorological Administration, Beijing (CN)

(72) Inventors: Yuchun Gao, Beijing (CN); Chen Li, Beijing (CN); Yubao Chen, Beijing (CN); Hu Chen, Beijing (CN); Changxing Li, Beijing (CN); Jianbing Lu, Beijing (CN); Haihe Liang, Beijing (CN); Xiaopeng Wang, Beijing (CN); Yingchun Chen, Beijing (CN); Zhichao Bu, Beijing (CN); Xu Han, Beijing (CN); Nan Shao, Beijing (CN); Jie Liu, Beijing (CN)

(73) Assignee: Meteorological Observation Centre of China Meteorological Administration, Beijing (CN)

( * ) Notice: Subject to any disclaimer, the term of this patent is extended or adjusted under 35 U.S.C. 154(b) by 325 days.

(21) Appl. No.: 17/403,873

(22) Filed: Aug. 16, 2021

(65) Prior Publication Data
US 2022/0365208 A1    Nov. 17, 2022

(30) Foreign Application Priority Data

May 11, 2021    (CN) .......................... 202110509616.1

(51) Int. Cl.
  *G01S 13/95* (2006.01)
  *G01S 7/41* (2006.01)
  (Continued)

(52) U.S. Cl.
  CPC .............. *G01S 13/95* (2013.01); *G01S 7/415* (2013.01); *H01Q 19/195* (2013.01); *G01S 2013/0245* (2013.01)

(58) Field of Classification Search
  CPC .. G01S 13/95; G01S 7/415; G01S 2013/0245; H01Q 19/195
  (Continued)

(56) References Cited

U.S. PATENT DOCUMENTS 5,872,535 A * 2/1999 Jordan ..................... G01S 13/58
                                                                  342/26 C
6,377,204 B1 * 4/2002 Wurman ............... G01S 13/003
                                                                  342/75
(Continued)

*Primary Examiner* — April G Gonzales
(74) *Attorney, Agent, or Firm* — Shih IP Law Group, PLLC

(57) ABSTRACT

The present disclosure relates to spherical dual-polarization phased array weather radar. The spherical dual-polarization phased array weather radar comprises a spherical crown phased array antenna module, a digital transceiver module and a signal processing module, wherein the spherical crown phased array antenna module comprises a spherical support frame and a plurality of dual-polarization micro-strip radiation units; the dual-polarized micro-strip radiation units are tightly arranged on the spherical support frame; the spherical crown phased array antenna module is used for detecting weather; wireless transmission is carried out between the digital transceiver module and the spherical crown phased array antenna module; the digital transceiver module is used for generating a frequency modulation signal or a phase coding signal required for detecting meteorological targets and receiving an echo signal reflected by the target; and the signal processing module is connected with the digital transceiver module.

9 Claims, 5 Drawing Sheets

(51) Int. Cl.
*H01Q 19/195* (2006.01)
*G01S 13/02* (2006.01)

(58) Field of Classification Search
USPC ....................................................... 455/562.1
See application file for complete search history.

(56) References Cited

U.S. PATENT DOCUMENTS

| | | | | |
|---|---|---|---|---|
| 7,307,596 | B1* | 12/2007 | West | H01Q 3/2658 |
| | | | | 343/778 |
| 8,988,274 | B2* | 3/2015 | Zhang | G01S 7/024 |
| | | | | 342/368 |
| 9,705,611 | B1* | 7/2017 | West | H04B 5/0031 |
| 11,630,203 | B2* | 4/2023 | Dubois | G01S 13/951 |
| | | | | 342/26 D |
| 2010/0292871 | A1* | 11/2010 | Schultz | G08G 5/045 |
| | | | | 342/29 |
| 2011/0285582 | A1* | 11/2011 | Zhang | G01S 7/024 |
| | | | | 342/175 |
| 2017/0199304 | A1* | 7/2017 | Kobayashi | G01S 13/95 |
| 2018/0062246 | A1* | 3/2018 | Hershey | H01Q 1/1242 |
| 2018/0090837 | A1* | 3/2018 | Schmidt | G01R 29/0821 |
| 2019/0027835 | A1* | 1/2019 | Hoyt | H01Q 15/14 |
| 2021/0389454 | A1* | 12/2021 | Gao | H01Q 25/001 |

* cited by examiner

SPHERICAL DUAL-POLARIZATION PHASED ARRAY WEATHER RADAR

CROSS REFERENCE TO RELATED APPLICATION(S)

This patent application claims the benefit and priority of Chinese Patent Application No. 202110509616.1, filed on May 11, 2021, the disclosure of which is incorporated by reference herein in its entirety as part of the present application.

TECHNICAL FIELD

The present disclosure relates to the technical field of weather radars, and particularly relates to spherical dual-polarization phased array weather radar.

BACKGROUND ART

The phased array weather radar is high in scanning speed, can adopt various processing methods, is the development direction of the weather radar, and will become mainstream equipment of the next-generation weather radar. At present, most antennas of the phased array weather radar are planar phased array antennas, the gains and the widths of beams are changed in beam scanning, standing waves of the antennas are fluctuated to a certain degree, the orthogonality between two polarizations is changed, and the problem that the weather radar is low in accuracy when detecting meteorological targets is caused.

For example, China patent no. CN 105356050 B, titled Variable-Directional Beam Dual-Array Synthetic Microstrip Array Antenna, proposes a variable directional beam dual-array synthetic micro-strip array antenna which allows the antenna to produce some fixed beams in the vertical direction, the flexibility is improved, but the antenna gain and beam width in different directions are still different and need to be corrected in back-end processing software. China utility model patent no. ZL202021079262.9 to Yuchun et al., titled Dual-Polarization Phased-Array Antenna and Dual-Polarization Phased-Array Weather Radar, provides a dual-polarization phased array antenna and a dual-polarization phased array weather radar, a transverse roller type antenna, pitching phased array scanning and azimuth mechanical scanning are adopted, the defects of an existing plane phased array weather radar are overcome through the method, the antenna gain and the beam width can be guaranteed to be unchanged during observation of the weather radar, and the orthogonality of horizontal polarization and vertical polarization is unchanged. However, mechanical rotation scanning in the azimuth of the method limits the flexibility of the radar in detecting meteorological targets, and the meteorological targets in different areas are difficult to measure and track simultaneously, so that the accuracy of the radar in detecting the meteorological targets is low. US patent application no. 2011/0285582 A1 to Zhang et al., titled Cylindrical Polarimetric Phased Array Radar, provides a dual-polarization phased array weather radar adopting a cylindrical antenna, phased array scanning is adopted in both azimuth and pitching, the method does not need mechanical rotation scanning, the orthogonality between two polarizations is also guaranteed, but during pitching beam scanning, due to different directions of beams, the problem that antenna gain and beam width are changed still exists, so that the accuracy of the radar for detecting the meteorological targets is low.

SUMMARY

The present disclosure aims to provide spherical dual-polarization phased array weather radar to solve the problem of low accuracy of the radar for detecting meteorological targets.

To achieve the purpose, the present disclosure provides the following scheme:

The spherical dual-polarization phased array weather radar comprises a spherical crown phased array antenna module, a digital transceiver module and a signal processing module;

the spherical crown phased array antenna module comprises a spherical support frame and a plurality of dual-polarization micro-strip radiation units; the dual-polarized micro-strip radiation units are tightly arranged on the spherical support frame, and the positions of the dual-polarized micro-strip radiation units are adjusted, so that the directions of beams emitted by the dual-polarized micro-strip radiation units are consistent with the normal directions of effective apertures of the spherical support frame; the spherical crown phased array antenna module is used for detecting weather;

wireless transmission is carried out between the digital transceiver module and the spherical crown phased array antenna module; the digital transceiver module is used for generating a frequency modulation signal or a phase coding signal required for detecting meteorological targets and receiving an echo signal reflected by the target;

the signal processing module is connected with the digital transceiver module; and the adjusted dual-polarization micro-strip radiation units send out the beams according to the frequency modulation signal or the phase coding signal, detect the meteorological targets and send the echo signal to the digital transceiver module, the digital transceiver module sends the echo signal to the signal processing module, and the signal processing module performs spectral analysis on the echo signal to obtain target echo information.

Optionally, the spherical crown phased array antenna module also comprises a plurality of electronic switches; one electronic switch corresponds to one of the dual-polarization micro-strip radiation units; and the electronic switches are used for controlling the dual-polarization micro-strip radiation units to carry out electronic scanning.

Optionally, the digital transceiver module specifically comprises a plurality of dual-channel digital T/R assemblies;

each dual-polarization micro-strip radiation unit corresponds to one of the dual-channel digital T/R assemblies; the dual-channel digital T/R assemblies are used for receiving and transmitting signals, and the signals comprise the frequency modulation signal, the phase coding signal or the echo signal.

Optionally, the dual-channel digital T/R assembly specifically comprises a digital receiving unit and a digital transmitting unit;

the digital transmitting units are used for generating the frequency modulation signal or the phase coding signal required for detecting the meteorological target; and the digital receiving units are used for receiving the echo signal reflected by the meteorological targets.

Optionally, the spherical dual-polarization phased array weather radar also comprises digital transmission networks; the digital transmission networks comprise a first digital transmission network and a second digital transmission network; the digital transmission networks are used for information interaction between the digital transceiver module and the signal processing module;

the first digital transmission network is arranged in the digital transceiver module, and one end of the first digital transmission network is connected with the dual-channel digital T/R assemblies; and the second digital transmission network is arranged in the signal processing module, and one end of the second digital transmission network is connected with the other end of the first digital transmission network.

Optionally, the signal processing module specifically comprises a multi-channel digital beam forming unit, a signal processing unit, a system control unit and a communication unit;

the multi-channel digital beam forming unit, the signal processing unit, the system control unit and the communication unit are all connected with the other end of the second digital transmission network;

the multi-channel digital beam forming unit is used for converting the echo signal received by the spherical crown phased array antenna module into a beam signal; the signal processing unit is used for performing spectral analysis on the beam signal to obtain target echo information; the system control unit is used for generating a control instruction; and the communication unit is used for sending the target echo information.

Optionally, the signal processing module is also connected with the electronic switches; and the system control unit is also used for controlling the electronic switches to be switched on and off according to the control instruction.

Optionally, the digital transmitting unit is an all-solid-state transmitter, and the system control unit controls the all-solid-state transmitter to be in a transmitting state or a transmitting stopping state.

Optionally, the spherical dual-polarization phased array weather radar also comprises a power supply module;

the power supply module is connected with the spherical crown phased array antenna module, the digital transceiver module and the signal processing module; and the power supply module is used for supplying power to the spherical dual-polarization phased array weather radar.

According to the specific embodiment provided by the present disclosure, the present disclosure has the following technical effects:

According to the spherical dual-polarization phased array weather radar, the directions of the beams emitted by the dual-polarized micro-strip radiation units are adjusted to be consistent with the normal directions of the effective apertures of the spherical support frame, so that the beams emitted by all the dual-polarized micro-strip radiation units always point to the normal directions of the effective apertures of the spherical support frame, and azimuth-pitching two-dimensional beam electric scanning is realized; and therefore, the widths of the beams emitted by the dual-polarization micro-strip radiation units and the antenna gain are not changed, the dual-polarization micro-strip radiation units emit the beams according to the frequency modulation signal or the phase coding signal to detect the meteorological target, and then the accuracy of the radar for detecting the meteorological targets is improved.

BRIEF DESCRIPTION OF THE DRAWINGS

To describe the technical scheme in the embodiments of the present disclosure or in the prior art more clearly, the following briefly introduces the attached figures required for describing the embodiments. Apparently, the attached figures in the following description show merely some embodiments of the present disclosure, and those skilled in the art may still derive other attached figures from these attached figures without creative efforts.

Reference signs: 1, dual-polarization micro-strip radiation unit; 2, spherical support; 3, antenna seat; 4, digital transceiver module; 5, signal processing module; 6, power supply module; 7, dual-channel digital T/R assembly; 8, first digital transmission network; 9, second transmission network; 10, multi-channel digital beam forming unit; 11, signal processing unit; 12, system control unit; 13, communication unit; 14, effective aperture; 15, beam.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide spherical dual-polarization phased array weather radar to solve the problem of low accuracy of the radar for detecting meteorological targets in the prior art.

To make the foregoing objective, features and advantages of the present disclosure clearer and more comprehensible, the present disclosure is further described in detail below with reference to the attached figures and specific embodiments.

In order to solve the problems in the prior art, the present disclosure provides the spherical dual-polarization phased array weather radar, and realizes two-dimensional electric scanning of beams in a full airspace without changed scanning of performance, namely, the beam width, the antenna gain, the dual-polarization channel performance and the radar irradiation volume are stable and unchanged during beam scanning of the spherical dual-polarization phased array radar. The mutual coupling relation between all the dual-polarization micro-strip radiation units 1 and transceiver channels is stable and unchanged, and the accuracy of weather detection and target identification is effectively improved.

Figure 1:
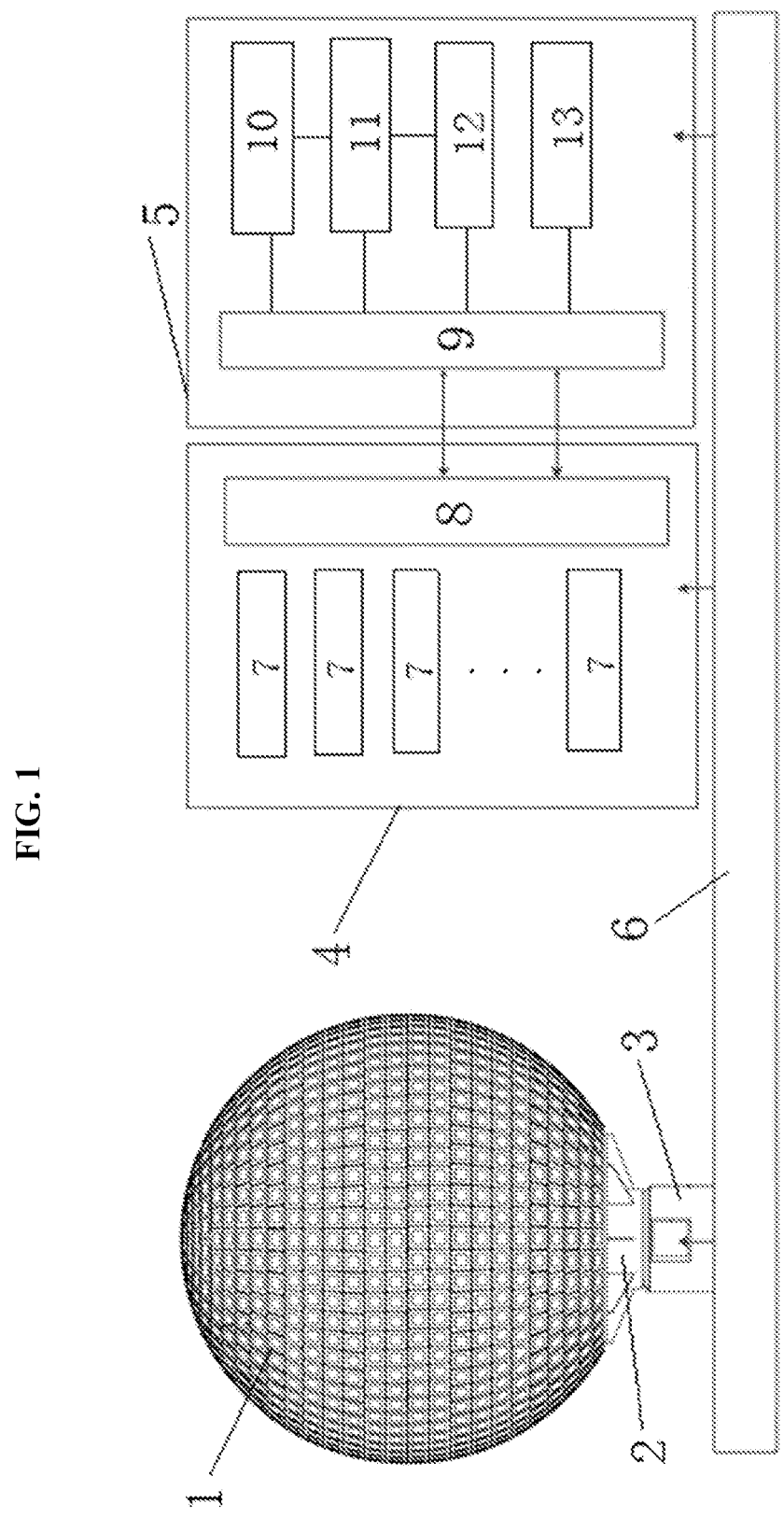
FIG. 1 is a system principle diagram of spherical dual-polarization phased array weather radar in the present disclosure.

FIG. 1 is a system principle diagram of the spherical dual-polarization phased array weather radar in the present disclosure; and as shown in FIG. 1, the spherical dual-polarization phased array weather radar mainly comprises an antenna seat 3, a spherical crown phased array antenna module, a digital transceiver module 4, a signal processing module 5 and a power supply module 6.

The array surface of the spherical dual-polarization phased array weather radar adopts spherical conformal phased array design, and all the dual-polarization micro-strip radiation units 1 on the array surface are arranged at equal included angles with the sphere center.

The spherical crown phased array antenna module comprises a spherical support frame 2 and a plurality of dual-polarization micro-strip radiation units 1; the dual-polarized micro-strip radiation units 1 are arranged on the spherical support frame 2, and are tightly arranged on the spherical support frame 2; the positions of the dual-polarized micro-strip radiation units 1 are adjusted, so that the directions of beams 15 emitted by the dual-polarized micro-strip radiation units 1 are consistent with the normal directions of effective apertures 14 of the spherical support frame 2; and the spherical crown phased array antenna module is used for detecting weather.

Wireless transmission is carried out between the digital transceiver module 4 and the spherical crown phased array antenna module; the digital transceiver module 4 is used for generating a frequency modulation signal or a phase coding signal required for detecting the meteorological targets and receiving an echo signal reflected by the target; the digital transceiver module 4 comprises a plurality of dual-channel digital T/R assemblies 7, each dual-polarization micro-strip radiation unit corresponds to one of the dual-channel digital T/R assemblies; the dual-channel digital T/R assemblies 7 are used for receiving and transmitting signals, and the signals comprise the frequency modulation signal, the phase coding signal or the echo signal. The dual-channel digital T/R assembly 7 comprises a digital receiving unit and a digital transmitting unit; the digital transmitting module is used for generating the frequency modulation signal or the phase coding signal required for detecting the meteorological target; and the digital receiving unit is used for receiving the echo signal reflected by the target. The digital transmitting unit is an all-solid-state transmitter, and the all-solid-state transmitter is controlled by the system control unit 12 (namely a radar control module) in the signal processing module to be in a transmitting state or a transmitting stopping state.

The spherical dual-polarization phased array weather radar also comprises digital transmission networks; the digital transmission networks comprise a first digital transmission network 8 and a second digital transmission network 9; the digital transmission networks are used for information interaction between the digital transceiver module 4 and the signal processing module 5.

The first digital transmission network 8 is arranged in the digital transceiver module 4, and one end of the first digital transmission network 8 is connected with the dual-channel digital T/R assemblies 7; and the second digital transmission network 9 is arranged in the signal processing module 5, and one end of the second digital transmission network 9 is connected with the other end of the first digital transmission network 8.

The signal processing module 5 is connected with the digital transceiver module 4 through the digital transmission networks, receives downlink data of the dual-channel digital T/R assemblies 7 and carries out subsequent processing; the signal processing module 5 is used for performing spectral analysis according to the echo signal to obtain target echo information; and the system control unit 12 in the signal processing module 5 is also used for generating a control instruction to drive the spherical crown phased array antenna module to carry out signal acquisition in the horizontal direction and/or signal acquisition in the pitching direction.

The spherical crown phased array antenna module also comprises a plurality of electronic switches; one electronic switch corresponds to one of the dual-polarization micro-strip radiation units 1; the signal processing module 5 is connected with the electronic switches in the spherical crown phased array antenna module; the system control unit 12 in the signal processing module 5 is used for controlling the electronic switch to be switched on and off according to the control instruction, and the spherical crown phased array antenna module forms electronic scanning at different angles in all directions according to the switching-on area of the electronic switches.

The signal processing module 5 comprises a multi-channel digital beam forming unit 10, a signal processing unit 11, a system control unit 12 and a communication unit 13; and the multi-channel digital beam forming unit 10, the signal processing unit 11, the system control unit 12 and the communication unit 13 are all connected with the other end of the second digital transmission network 9.

The multi-channel digital beam forming unit 10 is connected with the signal processing unit 11; the signal processing unit 11 is connected with the communication unit 13; the multi-channel digital beam forming unit 10 is used for converting the echo signal received by the spherical crown phased array antenna module into a beam signal; the signal processing unit 11 is used for performing spectral analysis on the beam signal to obtain target echo information; and the communication unit 13 is used for sending the target echo information.

Moreover, the spherical dual-polarization phased array weather radar also comprises a power supply module 6; the power supply module 6 is connected with the spherical crown phased array antenna module, the digital transceiver module 4 and the signal processing module 5; and the power supply module 6 is used for supplying power to the spherical dual-polarization phased array weather radar.

Figure 3:
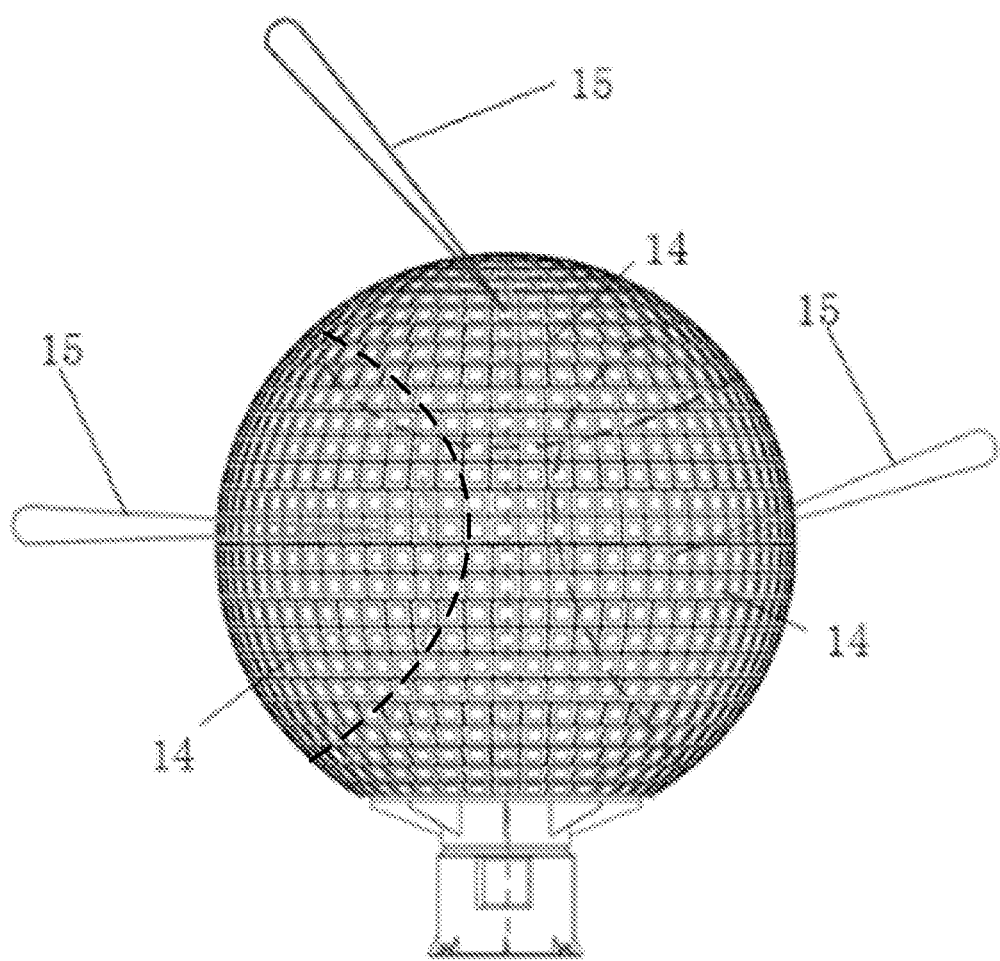
FIG. 3 is a beam schematic diagram of the spherical dual-polarization phased array weather radar in the present disclosure.
Figure 4:
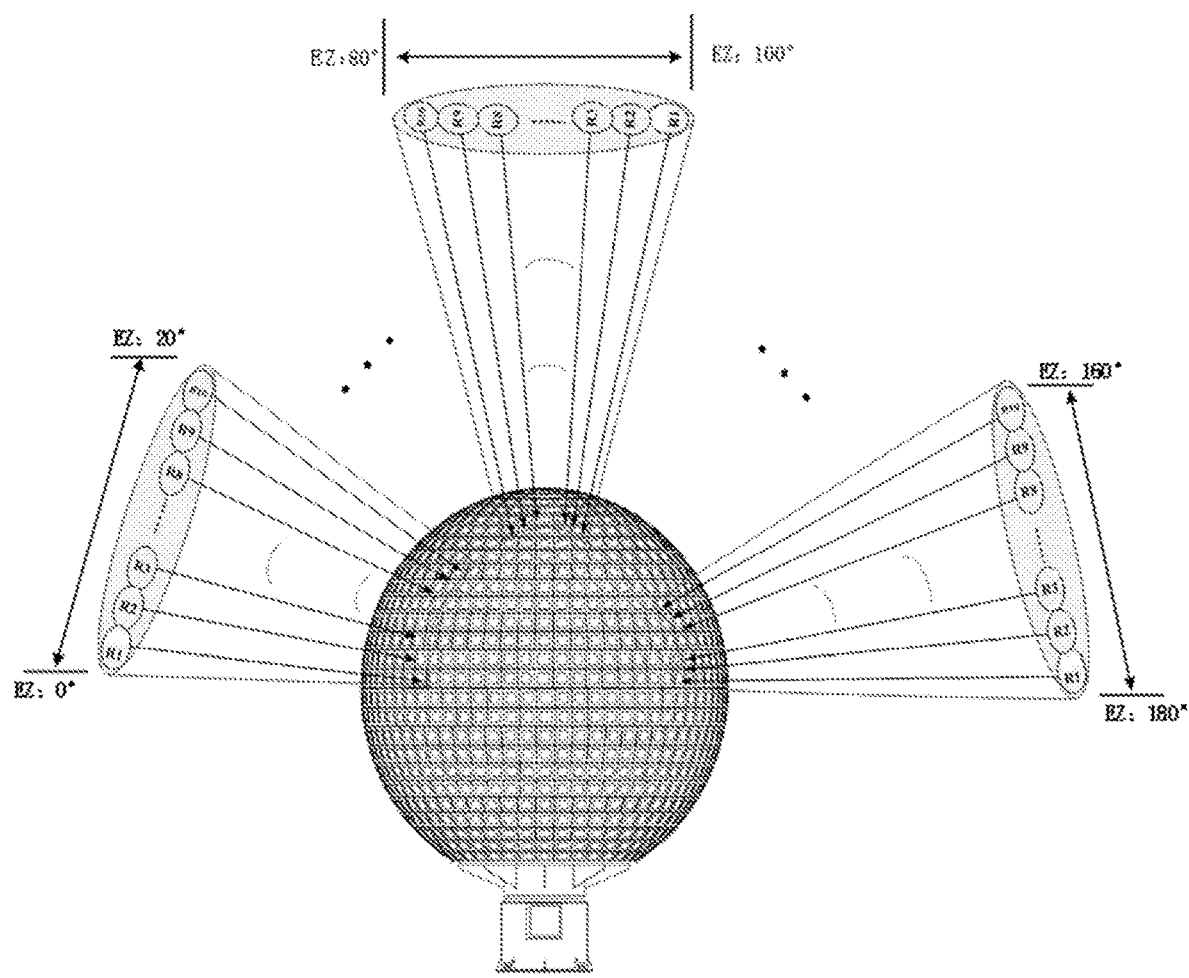
FIG. 4 is an effective aperture scanning schematic diagram of the spherical dual-polarization phased array weather radar in the present disclosure.

FIG. 3 is a beam schematic diagram of the spherical dual-polarization phased array weather radar in the present disclosure; FIG. 4 is an effective aperture scanning schematic diagram of the spherical dual-polarization phased array weather radar in the present disclosure; and as shown in FIG. 3 and FIG. 4, in the electric scanning process of the spherical dual-polarization phased array weather radar, main beams always point to the normal directions of cambered surfaces of the effective apertures 14, the directions of the beams 15 emitted by the dual-polarized micro-strip radiation units 1 are adjusted to be consistent with the normal directions of the effective apertures 14 of the spherical support frame 2, so that the beams 15 emitted by all the dual-polarized micro-strip radiation units 1 always point to the normal directions of the effective apertures 14 of the spherical support frame 2, and azimuth-pitching two-dimensional beam electric scanning is realized; and therefore, the widths of the beams and the gain are not changed. The selection of the working units is realized through a control terminal. The control terminal calculates a vertical chord plane and the effective apertures 14 according to beam pointing (azimuth and pitching) angles by sending a thunder control message instruction, and selects the normal operation of transceiver active channels in the effective apertures 14, and channels in non-effective apertures are all closed to form scanning beams with corresponding pointing. As shown in FIG. 4, R1 to R10 represent a beam 1 to a beam 10 received by the dual-polarization micro-strip radiation units 1, and EZ represents a pitching angle.

The spherical dual-polarization phased array weather radar firstly receives an external instruction or sets working parameters according to built-in parameters, the signal processing module 5 generates a timing signal required by the working of the whole machine, and the system enters working modes. Under the action of modulating pulse, the signal is generated to form the frequency modulation signal or the phase coding signal required for detecting the meteorological target, an excitation signal is sent to the digital transceiver module 4 after the frequency is converted to a system working wave band in an uplink mode, and amplified power is radiated by the dual-polarization micro-strip radiation units 1. After encountering the meteorological target, electromagnetic waves generate backscattering return, the dual-polarization micro-strip radiation units 1 receive the echo signal, the echo signal enters a receiving link of the digital transceiver module 4, and the echo signal is transmitted into the multi-channel digital beam forming unit 10 after being subjected to low-noise amplification, filter and down-conversion to digital intermediate frequency and analog-to-digital converter sampling. A beam receiving signal is formed in the multi-channel digital beam forming unit 10, and then spectral analysis is carried out through the signal processing unit 11 to obtain target echo information. The echo information is transmitted to the control terminal through the communication unit 13.

The detection distance of the spherical dual-polarization phased array weather radar is larger than or equal to 400 km, generation, development, dissipation and movement states of a strong convection dangerous weather system within the range of 400 km around a radar station can be detected and obtained, effective monitoring and early warning are carried out on disastrous weather such as meso-scale storm, rainstorm, wind shear, hail and tornado within the range of 200 km, and timely and accurate meteorological detection data is provided for the meteorological support of a user.

Figure 5:
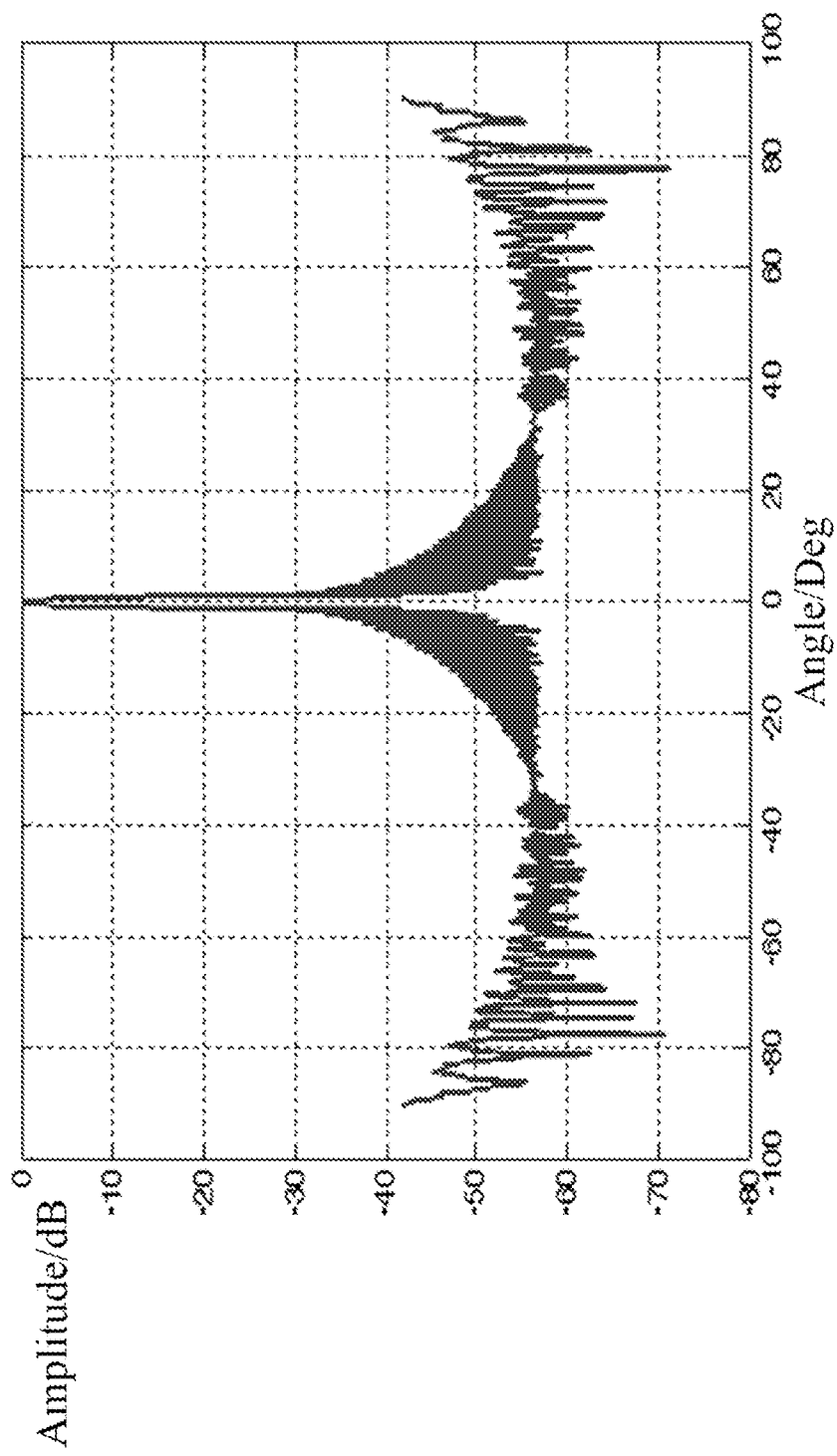
FIG. 5 is an antenna scanning lobe pattern of the spherical dual-polarization phased array weather radar in the present disclosure.

In one specific embodiment, FIG. 5 is an antenna scanning lobe pattern of the spherical dual-polarization phased array weather radar in the present disclosure, as shown in FIG. 5, the beam width is designed to be 1°, and the radar is selected to operate in the C-band (5400 MHz to 5600 MHz), so that the sphere diameter D is equal to 4.5 m, and weighting of a digital beam maximum side lobe SLL being smaller than or equal to 30 dB is received. When the number of units on the spherical equator Nmax is equal to 380, grating lobes do not appear at 5400 MHz to 5600 MHz. In order to guarantee the coverage of the airspace with the azimuth ranging from 0 to 360° and the pitching ranging from −2° to +182°, n (41938) dual-polarized micro-strip radiation units 1 are totally arranged in the whole array.

According to the design of the spherical phased array dual-polarization weather radar, a pulse compression system is adopted, the distance resolution and the action distance are considered, the signal waveform is in a linear frequency modulation pulse mode, a nonlinear frequency modulation pulse mode and a phase coding pulse mode, the maximum signal bandwidth is 15 MHz, and the distance resolution is superior to 10 m. The pulse width is adjustable in a range from 0.5 microseconds to 200 microseconds. After pulse compression, the distance side lobe is reduced through frequency domain weighting processing in signal processing.

During dual-polarization work, the transmitted waveforms of horizontal polarization and vertical polarization can be the same, and an orthogonal coding form can also be adopted, so that the isolation between two channels during dual-polarization work is improved. The working modes of the spherical phased array dual-polarization weather radar are divided into a Doppler working mode and a polarization working mode.

In the Doppler working mode, the system carries out speed, spectral width and intensity processing on echoes and estimates relevant information of the weather target from the echoes.

The polarization working mode is mainly used for processing parameters such as ZDR, Phi DP, LDR and Rho OHV except for processing conventional Doppler Z/V/W.

In order to guarantee the maximum detection distance of the system, a linear frequency modulation pulse waveform is adopted according to the working principle of weather radar and the requirements of system detection, and the requirements of system detection power are met by utilizing a pulse compression technology.

Figure 2:
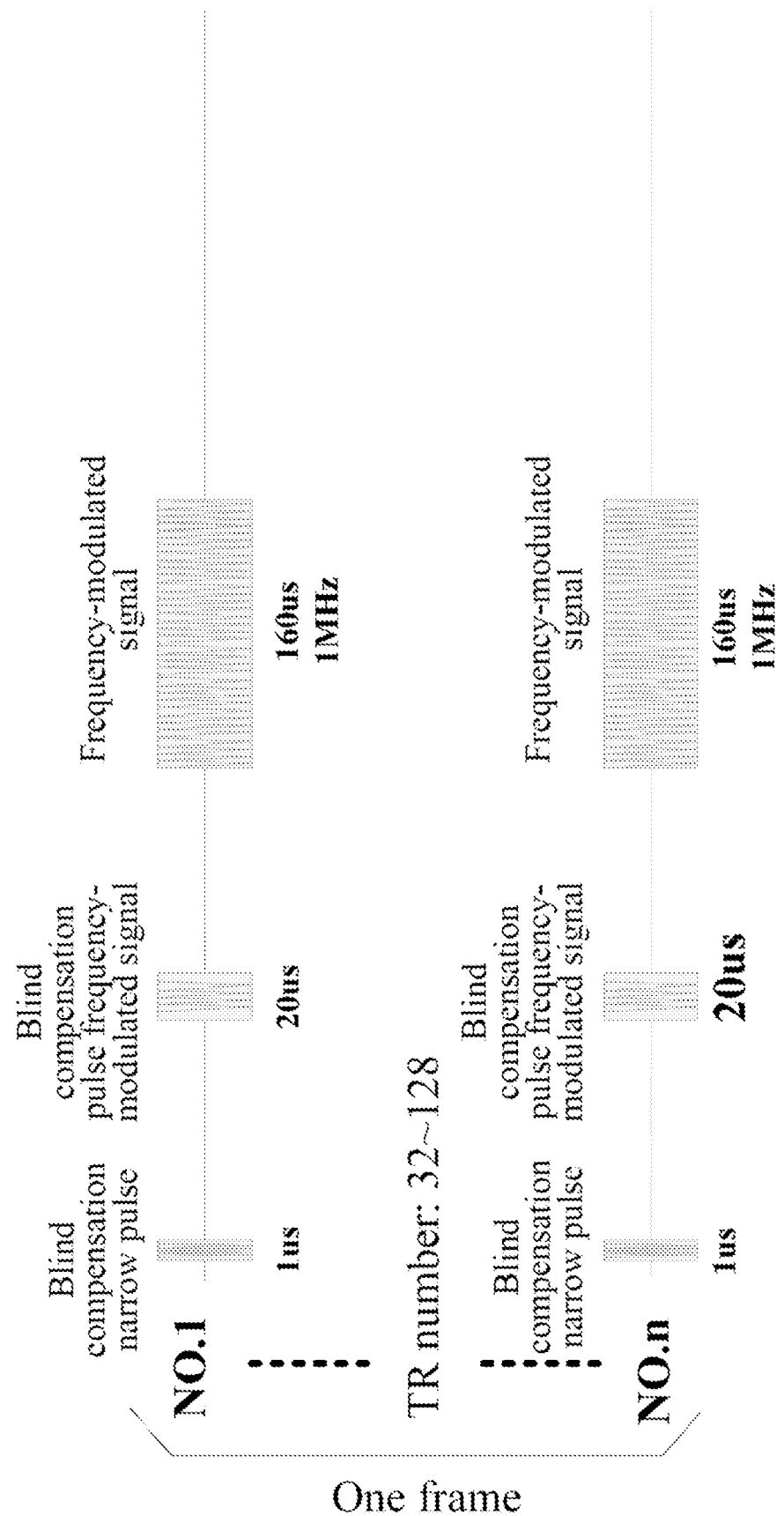
FIG. 2 is a transmitted waveform schematic diagram of the spherical dual-polarization phased array weather radar in the present disclosure.

FIG. 2 is a transmitted waveform schematic diagram of the spherical dual-polarization phased array weather radar in the present disclosure, as shown in FIG. 2, when the system works, the pulse width is 20 microseconds to 160 microseconds, the corresponding signal bandwidth is 2.5 MHz and 5 MHz, and the pulse width is compressed to 0.3 microseconds or 0.6 microseconds by using a digital pulse compression technology in signal processing. For a close-range blind area caused by transmitted wide pulse, a blind compensation pulse signal is transmitted to carry out close-range blind compensation, and the width of a blind compensation narrow pulse is 0.5-5 microseconds which can be set by software. The width of the blind compensation frequency modulation pulse is 10 microseconds or 20 microseconds which can be set by software.

Radar beams are designed in a wide-transmitting and narrow-receiving multi-beam form, an intra-pulse inter-frequency narrow-transmitting and narrow-receiving multi-beam form, a wide-band narrow-transmitting and narrow-receiving single-beam form and the like.

The wide-transmitting and narrow-receiving multi-beam form means that wide beams are transmitted, and then multiple beams are received through a digital beam forming technology, so that three-dimensional scanning of the airspace is realized. The transmitted signals adopt a long/narrow double-pulse or long/medium/narrow three-pulse working waveform, wherein the long/medium pulse adopts a linear frequency modulation or phase coding signal form, the narrow pulse adopts a single carrier frequency signal form, the medium pulse and the narrow pulse are used for short-range blind compensation, and finally the multi-channel digital beam forming unit 10 forms a receiving beam signal and sends the receiving beam signal to the signal processing unit 11 for processing.

The spherical crown phased array antenna module transmits multiple beams using intra-pulse narrow transmitting and narrow receiving, receives echo signals separated by frequency isolation at different scanning angles, and finally multi-beam signals are received through the multi-channel digital beam forming unit 10 and sent to the signal processing unit 11 for processing. A single carrier frequency signal mode is adopted for short-range blind compensation, and short-range blind areas of different scanning angles are subjected to blind area compensation through five narrow pulses.

Single-beam working is adopted for wide-band narrow transmitting and narrow receiving, the purpose of designing the working mode is designed to provide high distance resolution, the signal bandwidth is 15 MHz, and the distance resolution can reach 10 m. The transmitted signals adopt a long/narrow double-pulse or long/medium/narrow three-pulse working waveform, wherein the long/medium pulse adopts a linear frequency modulation or phase coding signal form, the narrow pulse adopts a single carrier frequency signal form, the medium pulse and the narrow pulse are used for short-range blind compensation, and finally the multi-beam signals are received through the multi-channel digital beam forming unit 10 and sent to the signal processing unit 11 for processing.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A spherical dual-polarization phased array weather radar system, the system comprising:
   a spherical crown phased array antenna module including a spherical support frame and a plurality of dual-polarization micro-strip radiation units, the dual-polarized micro-strip radiation units being tightly arranged on the spherical support frame, and the positions of the dual-polarized micro-strip radiation units are adjusted, so that the directions of beams emitted by the dual-polarized micro-strip radiation units are consistent with the normal directions of effective apertures of the spherical support frame;
   a digital transceiver module configured to generate a frequency modulation signal or a phase coding signal required for detecting meteorological targets and receive an echo signal reflected by the target and transmit information wirelessly with the spherical crown phased array antenna module; and
   a signal processing module is connected with the digital transceiver module,
   wherein the adjusted dual-polarization micro-strip radiation units are configured to send out the beams according to the frequency modulation signal or the phase coding signal, detect the meteorological targets and send the echo signal to the digital transceiver module,
   the digital transceiver module is configured to send the echo signal to the signal processing module, and
   the signal processing module is configured to perform spectral analysis on the echo signal to obtain target echo information.

2. The spherical dual-polarization phased array weather radar system according to claim 1, the spherical crown phased array antenna module further comprising a plurality of electronic switches configured to control the dual-polarization micro-strip radiation units to carry out electronic scanning, each of the electronic switches corresponds to one of the dual-polarization micro-strip radiation units.

3. The spherical dual-polarization phased array weather radar system according to claim 2, the digital transceiver module further comprises a plurality of dual-channel digital T/R assemblies configured to receive and transmit signals, wherein each dual-polarization micro-strip radiation unit corresponds to one of the dual-channel digital T/R assemblies, and
   the signals comprise the frequency modulation signal, the phase coding signal or the echo signal.

4. The spherical dual-polarization phased array weather radar system according to claim 3, wherein each of the dual-channel digital T/R assemblies comprise a digital receiving unit and a digital transmitting unit,
   the digital transmitting units are configured to generate the frequency modulation signal or the phase coding signal required for detecting the meteorological target; and
   the digital receiving units are configured to receive the echo signal reflected by the meteorological targets.

5. The spherical dual-polarization phased array weather radar system according to claim 4, the system further comprises a first digital transmission network and a second digital transmission network, each configured for information interaction between the digital transceiver module and the signal processing module;
   the first digital transmission network is arranged in the digital transceiver module, and one end of the first digital transmission network is connected with the dual-channel digital T/R assemblies; and
   the second digital transmission network is arranged in the signal processing module, and one end of the second digital transmission network is connected with the other end of the first digital transmission network.

6. The spherical dual-polarization phased array weather radar system according to claim 5, the signal processing module comprises a multi-channel digital beam forming unit, a signal processing unit, a system control unit and a communication unit,
   wherein the multi-channel digital beam forming unit, the signal processing unit, the system control unit and the communication unit are all connected with the other end of the second digital transmission network, and
   the multi-channel digital beam forming unit is configured to convert the echo signal received by the spherical crown phased array antenna module into a beam signal,
   the signal processing unit is configured to perform spectral analysis on the beam signal to obtain target echo information,
   the system control unit is configured to generate a control instruction, and
   the communication unit is configured to send the target echo information.

7. The spherical dual-polarization phased array weather radar system according to claim 6, wherein the signal processing module is connected with the electronic switches; and the system control unit is configured to control the electronic switches to be switched on and off according to the control instruction.

8. The spherical dual-polarization phased array weather radar system according to claim 7, wherein the digital transmitting unit is an all-solid-state transmitter, and the system control unit controls the all-solid-state transmitter to be in a transmitting state or a transmitting stopping state.

9. The spherical dual-polarization phased array weather radar system according to claim 8, the system further comprises a power supply module connected with the spherical crown phased array antenna module, the digital transceiver module and the signal processing module, wherein the power supply module supplies power to the spherical dual-polarization phased array weather radar system.

\* \* \* \* \*